US007885986B2

(12) United States Patent
Anderson et al.

(10) Patent No.: US 7,885,986 B2
(45) Date of Patent: Feb. 8, 2011

(54) ENHANCED BROWSING EXPERIENCE IN SOCIAL BOOKMARKING BASED ON SELF TAGS

(75) Inventors: Brigham Anderson, Woodinville, WA (US); David M. Chickering, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 447 days.

(21) Appl. No.: 11/769,146

(22) Filed: Jun. 27, 2007

(65) Prior Publication Data

US 2009/0006442 A1    Jan. 1, 2009

(51) Int. Cl.
G06F 7/00 (2006.01)
G06F 17/30 (2006.01)
(52) U.S. Cl. .................................. 707/805; 715/206
(58) Field of Classification Search ................. None
See application file for complete search history.

(56) References Cited

U.S. PATENT DOCUMENTS

| 7,069,308 | B2 | 6/2006 | Abrams |
| 7,493,294 | B2* | 2/2009 | Flinn et al. ............. 706/12 |
| 2006/0004713 | A1 | 1/2006 | Korte et al. |
| 2006/0069699 | A1 | 3/2006 | Smadja et al. |
| 2006/0155764 | A1 | 7/2006 | Tao |
| 2006/0165040 | A1 | 7/2006 | Rathod et al. |
| 2006/0173838 | A1 | 8/2006 | Garg et al. |
| 2006/0184608 | A1 | 8/2006 | Williams et al. |
| 2006/0184617 | A1 | 8/2006 | Nicholas et al. |
| 2006/0294043 | A1 | 12/2006 | Taisdeal |
| 2007/0067331 | A1* | 3/2007 | Schachter et al. .......... 707/102 |
| 2007/0124208 | A1* | 5/2007 | Schachter et al. .......... 707/102 |
| 2009/0187576 | A1* | 7/2009 | Muller et al. .............. 707/10 |

FOREIGN PATENT DOCUMENTS

| WO | WO2005029362 A1 | 3/2005 |
| WO | WO2006107956 A1 | 10/2006 |

OTHER PUBLICATIONS

Stoilova, et al., "GiveALink: Mining a Semantic Network of Bookmarks for Web Search and Recommendation", LinkKDD'05, Aug. 21, 2005, ACM, 2005, pp. 66-73.
Szekely, et al., "Ranking Bookmarks and Bistros: Intelligent Community and Folksonomy Development", May 2005, pp. 6.
Al-Khalifa, et al., "FolksAnnotation: A Semantic Metadata Tool for Annotating Learning Resources Using Folksonomies and Domain Onotologies", IEEE, 2006, pp. 5.

* cited by examiner

Primary Examiner—Sathyanarayan Pannala

(57) ABSTRACT

Improved browsing experience in social bookmarking by leveraging aspects of self tagging and prediction. Quality recommendations are provided for sites of interest to the user and information about what types of people like the current website. Self-tagging is used as an effective means to perform personalized searches. Machine learning and reasoning is employed to predict self-tags based on a website visited and/or website behavior, and self-tags associated with a website and/or webpage based on content of that website and/or webpage. The architecture can be embodied as a browser utility to leverage and extend social-bookmarking information. The utility facilitates the display of information related to a summary view of the users who liked/disliked the current page or website, a tag cloud associated with webpages, and a recommendation button that causes self-tag recommendations to be displayed and that recommends links based on the combination of user tags and content.

20 Claims, 13 Drawing Sheets

ENHANCED BROWSING EXPERIENCE IN SOCIAL BOOKMARKING BASED ON SELF TAGS

BACKGROUND

The advent of the Internet has made available to users enormous amounts of information. In many instances, this information is presented in the format of webpages that present content and advertising. Improvements in search engines have helped to provide information related to what the user is looking for, yet this can still amount to more information than can be perused in a short period of time.

Social networks serve as one attempt to provide a way for users to find the information desired based on other users who have the same or similar interests. Rather than reviewing ranked lists of search results based on search terms, the user will have a greater likelihood of finding the desired information faster and with perhaps greater quality in the social network.

Social bookmarking is a technique for sharing bookmarks with other users who may have similar interests. Social bookmarking sites take advantage of a large user community where the community members can submit links and vote on links submitted by other members. These sites can use the voting behavior to "filter" the links and present the items ordered by popularity. The primary value to the user is access to high-quality information, rather than the barrage of information that includes a mix of interesting and uninteresting content. Moreover, such sites can provide a venue for deriving revenue based on more focused advertising to groups of users associated with a particular subject. However, with the ever-increasing number of datasources coming online, conventional social networks and bookmarking systems still lack the quality and effectiveness desired by the user.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture provides a more efficient and effective browsing experience in the realm of social bookmarking. For example, quality recommendations can be provided for websites of interest to the user and information about what types of people like the current website. More specifically, the architecture exploits at least the following: self-tagging as a more effective means to perform personalized searches, machine learning and reasoning to predict self-tags based on a website visited and/or website behavior, and machine learning and reasoning to predict self-tags associated with a website and/or webpage based on content of that website and/or webpage.

Additionally, the architecture can be embodied as a browser utility to leverage and extend social-bookmarking information. The browser utility indexes the web (or Internet) using social-bookmarking information that (necessarily) includes the self tags associated with users who liked and/or disliked a webpage and/or website. The utility can facilitate the display of a summary view of the users who liked or disliked the current page or site, where that view is a function of at least one self tag. The utility can display a tag cloud associated with webpages, where the tag cloud shows an aggregate view of the tags associated with users who liked or disliked the page. The browser utility can include a recommendation button that causes self-tag recommendations to be displayed and that recommends links based on the combination of user tags and content.

To the accomplishment of the foregoing and related ends, certain illustrative aspects are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
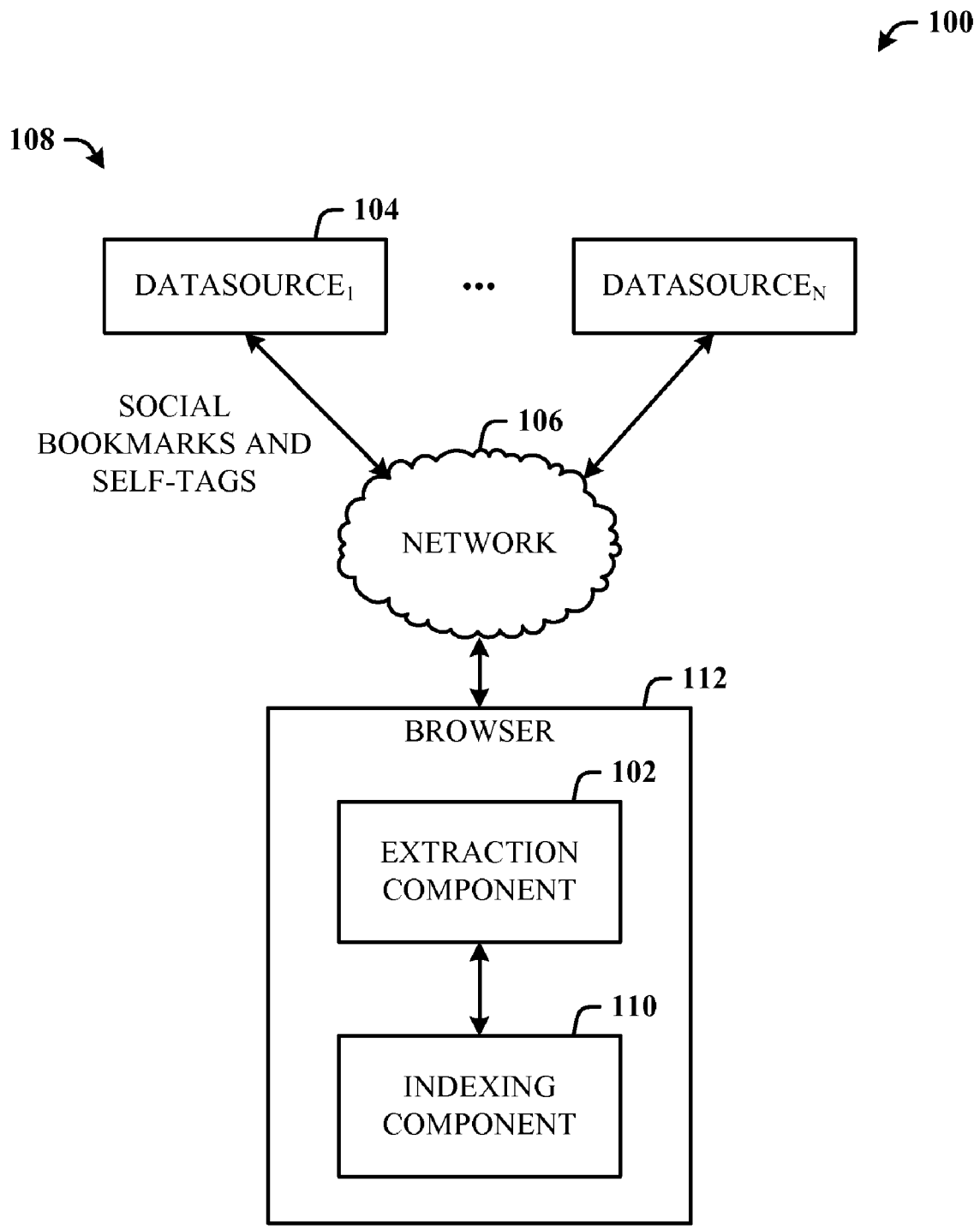
FIG. 1 illustrates a computer-implemented system for enhanced browsing based on social bookmarks and self tags.

The disclosed architecture provides functionality that benefits from previously-provided self tags thereby providing high quality information that links demographics, interests, and browsing behavior, to name a few. Embodied in one implementation as a utility that can be added to a web browser, the architecture leverages and extends social-bookmarking information. The utility makes a browsing experience more efficient (by giving good recommendations for sites of interest to the user) and more social (by giving information about what types of people like a current website). The utility facilitates the indexing of a network (e.g., the Internet) using social-bookmarking information that includes the self tags associated with website visitors who previously logged opinion data related the website, webpages of the website and/or content of a webpage, for example.

As an extension to typical social bookmarking websites, self tags can be used to assist in filtering the links. Self-tagging is the concept that community users can attribute arbitrary tags to themselves, and then the bookmarking websites can use those tags to make better recommendations. For example, a first user could self tag with attributes such as "male", "Microsoft employee", and "Redmond". The bookmarking website can then bias the recommendations presented to the first user by looking at the popularity of items among those community users who are most like (or similar to) the first user.

In one implementation, a browser utility is provided that facilitates creation and exposure of a user profile (that can include self tags) that is human understandable. In other words, the user can instantly see what the system knows about the user (e.g., the user tags) and the user can manually adjust the profile. In other words, the user does not need to laboriously label many random items in order to teach the system user preferences—the user can enter self tags expeditiously. An additional benefit is that the system's model of visitor opinions (e.g., like/dislike) of an item (e.g., website, webpage, content, etc.) can be displayed to the user as a panel in the browser (referred to as a "tag cloud"). Other aspects are described in detail herein.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof.

Referring initially to the drawings, FIG. 1 illustrates a computer-implemented system 100 for enhanced browsing based on social bookmarks and self tags. The system 100 includes an extraction component 102 for extracting social bookmarking information and associated self tags of a datasource 104 on a network 106. The datasource 104 can be one of many datasources 108 (denoted (DATASOURCE$_1$, . . . , DATASOURCE$_N$, where N is a positive integer), which datasources 108 can be websites and/or webpages, for example. Such datasources 108 may or may not include social bookmarks and/or self tags from other visitors. The bookmarks and self tags of other users can provide basic information such as if a user liked or did not like the website, in general, and webpages or webpage content, in particular.

The system 100 can further include an indexing component 110 for indexing the network datasources 108 using bookmarking and associated self tags. In other words, once the user has obtained the bookmarking and associated self tags information from previous visitors, this information can be used to provide a more focused index of information the user may desire to perceive. Thereafter, a search of the indexed information facilitates a more effective and efficient user experience.

The extraction component 102 and the indexing component 110 can be embodied as part of or in association with a browser 112 such that a user can interact with social bookmarking websites and website tags in ways described herein. This includes facilitating the indexing and searching of social bookmarking websites via the browser user interface (UI). Moreover, based on the indexed results, the UI presents panels that allow the user to list and edit self tags, display tags strongly associated with the current website, options to express user opinion of the website, and other graphical options related to recommendations, personalized searching and advertisements, for example.

Following is an exemplary browser implementation that illustrates usage of the system 100, and system and methodologies described herein. It is to be understood, however, that the disclosed architecture is not restricted to a browser, but can be employed in many different types of applications (e.g., a word processor, a spreadsheet, etc.) that can access information from a datasource.

A new user downloads and installs a plug-in (or utility) in the user's browser. The utility exposes several user interface buttons as part of the browser which facilitates user interaction with the disclosed functionality and website documents, content, etc. Assume that the user seeks physical address information (e.g., streets and avenues) for the Seattle area. Further assume that the user has opened a webpage that shows a map of the Seattle area. When the user selects one of the newly-installed buttons, a panel opens in the main browser window. Since the user is viewing a Seattle city map website, the side panel's tag cloud (or collection of tags associated with the site) can include terms such as "seattle", "commuter", and "redmond". This is interesting information for the user, since the user now knows a little more about other website visitors in the population (or community) who share similar interests.

Continuing on, the user browses other sites and webpages randomly, surfing favorite sites and noting (in the side panel) information related to other visitors who may have similar interests. The information presented can be made selectable. Accordingly, the user can select a "seattle" tag, for instance, which presents a list of websites that are especially liked by other people that have the Seattle tag. Additionally, next to the list of web sites is a panel, advertisements can be presented that are associated with the tags (e.g., directed to people that live in Seattle).

Up to this point, the user has not been required to log-in or provide any tags. However, the browser utility presents one or more buttons that allow the user to vote on various aspects of the site (e.g., website, in general, webpages, and/or content). The ability to vote on certain aspects of the website can be made to require registration or log-in. Given that the user is interested in "diabetes" content and that the user would like to vote on the content, the log-in or registration process requires the creation of a user profile. Once the registration has been completed, the browser utility facilitates the presentation of user self-tags list (which would be empty for a new registration). The user can then enter new self tags to include as representation in the user community for that site. For example, the user can enter "female", "seattle", and "diabetes".

The browser utility also facilitates a "personalized search". The user can enter "diabetes" as a search term, which could return ranked search results with top-ranked results include a list of Seattle diabetes care centers and health information for diabetic women.

Figure 2:
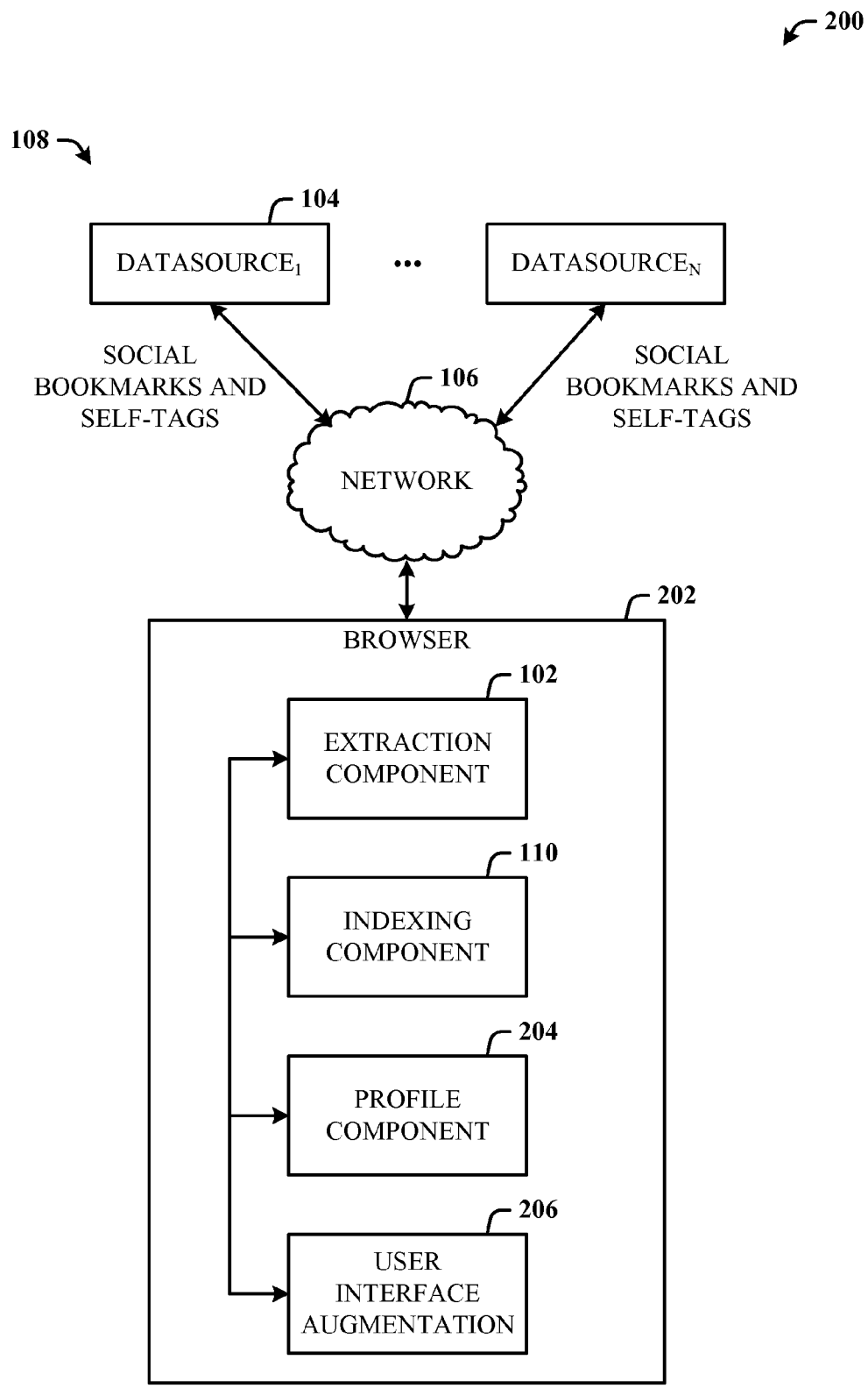
FIG. 2 illustrates an alternative system where the extraction and indexing components of FIG. 1 are provided as a utility for a browser.

FIG. 2 illustrates an alternative system 200 where the extraction and indexing components of FIG. 1 are provided as a utility for a browser 202. The browser 202 further includes a profile component 204 such that the user can create one or more profiles of user preferences and/or self tags. In one implementation, the self tags of a given user profile are accessed as part of a search initiated by the same user. In another embodiment, the self tags of a user profile stored at a website are automatically accessed to index the network of datasources (e.g., websites) and thereby, provide a more meaningful collection of social bookmarks from which to make further selections.

The system 200 can include a user interface augmentation (UIA) (or component) 206 that presents social bookmarking and self tag information to the user. The UI component 206 can present a listing of indexed social bookmarking information and associated self tags as indexed by the indexing component 110 and a listing of the self tags most strongly associated with the datasource. The UI component 206 presents one or more buttons for logging opinion data associated with the datasource. The opinion data can be in the form of "like it" and/or "don't like it" terminology, for example, where the user is voting or logging opinions related to at least one of a website, webpage, or content of the webpage.

Figure 3:
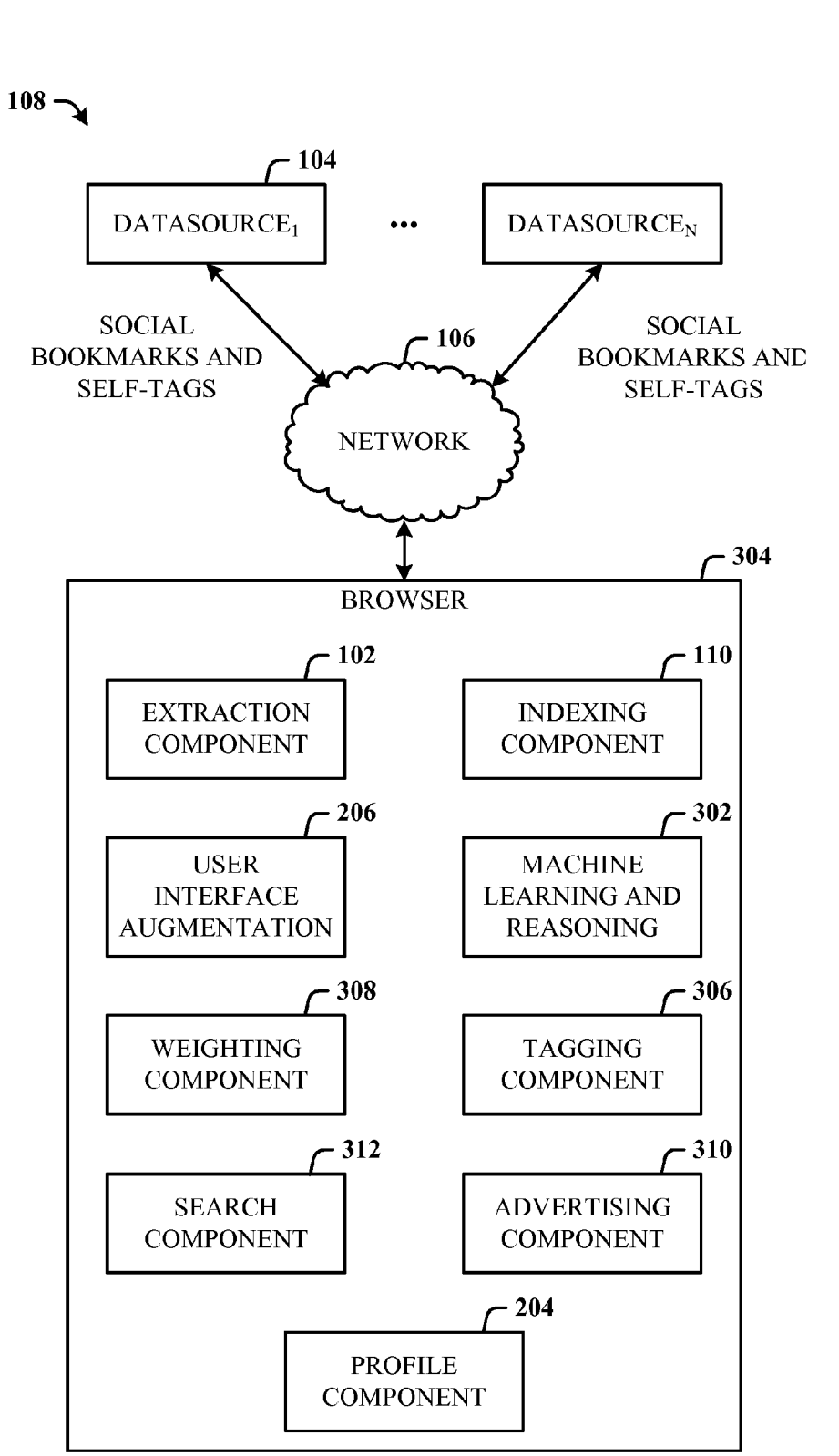
FIG. 3 illustrates an alternative and more robust system that employs a machine learning and reasoning component for decision-theoretic processing of one or more aspects of the disclosed architecture.

FIG. 3 illustrates an alternative and more robust system 300 that employs a machine learning and reasoning (MLR) component 302 for decision-theoretic processing of one or more aspects of the disclosed architecture. The subject architecture (e.g., in connection with selection) can employ various MLR-based schemes for carrying out various aspects thereof. For example, a process for presenting sample self tags to adopt can be facilitated via an automatic classifier system and process.

A classifier is a function that maps an input attribute vector, $x=(x1, x2, x3, x4, xn)$, to a class label class(x). The classifier can also output a confidence that the input belongs to a class, that is, $f(x)$=confidence (class(x)). Such classification can employ a probabilistic and/or other statistical analysis (e.g., one factoring into the analysis utilities and costs to maximize the expected value to one or more people) to prognose or infer an action that a user desires to be automatically performed.

As used herein, terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

A support vector machine (SVM) is an example of a classifier that can be employed. The SVM operates by finding a hypersurface in the space of possible inputs that splits the triggering input events from the non-triggering events in an optimal way. Intuitively, this makes the classification correct for testing data that is near, but not identical to training data. Other directed and undirected model classification approaches include, for example, various forms of statistical regression, naïve Bayes, Bayesian networks, decision trees, neural networks, fuzzy logic models, and other statistical classification models representing different patterns of independence can be employed. Classification as used herein also is inclusive of methods used to assign rank and/or priority.

As will be readily appreciated from the subject specification, the subject architecture can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be employed to automatically learn and perform a number of functions according to predetermined criteria.

The MLR component 302 can be employed in a browser 304 to "predict" the self tags a user may want to use based on a particular website, webpage of the website and/or content of a webpage. In another example, the MLR component 302 can be utilized to predict the self tags that a user may want to use based on user activity of a website and/or user voting behavior. In yet another example, links to other websites and/or webpages can be recommended to the user based on a combination of self tags and website content or webpage content. This can further be filtered based on the MLR component 302 learning and reasoning that the user prefers one type of content over another type of content.

Further examples, include the MLR component 302 providing candidate self tags for a personalized search and which entries to present in a summary view of other website visitors who liked or disliked aspects being presented for voting.

The browser 304 can also include a tagging component 306 for automatically tagging social bookmarking information and/or associated self tags of previous visitors with user self tags based on the user profile. In other words, a website can retain a record or database of social bookmarks and/or self tags provided by other uses that registered and/or updated previous registrations or user profiles. A weighting component 308 allows a user to weight self tags to bias tag attributes to the desired websites, webpages, content, and other social bookmarks and self tags, for example.

The browser 304 can also include an advertising component 310 for providing targeted advertising based on the user self tags, content being viewed, the website and/or webpages. A search component 312 facilitates a user search over selected datasources. For example, a search can be conducted over the indexed network datasources based on previously-defined user self tags. A personalized search can also be performed using user self tags to bias a search to particular collections of information (e.g., websites, webpages, webpage content, previous visitors, etc.).

Figure 4:
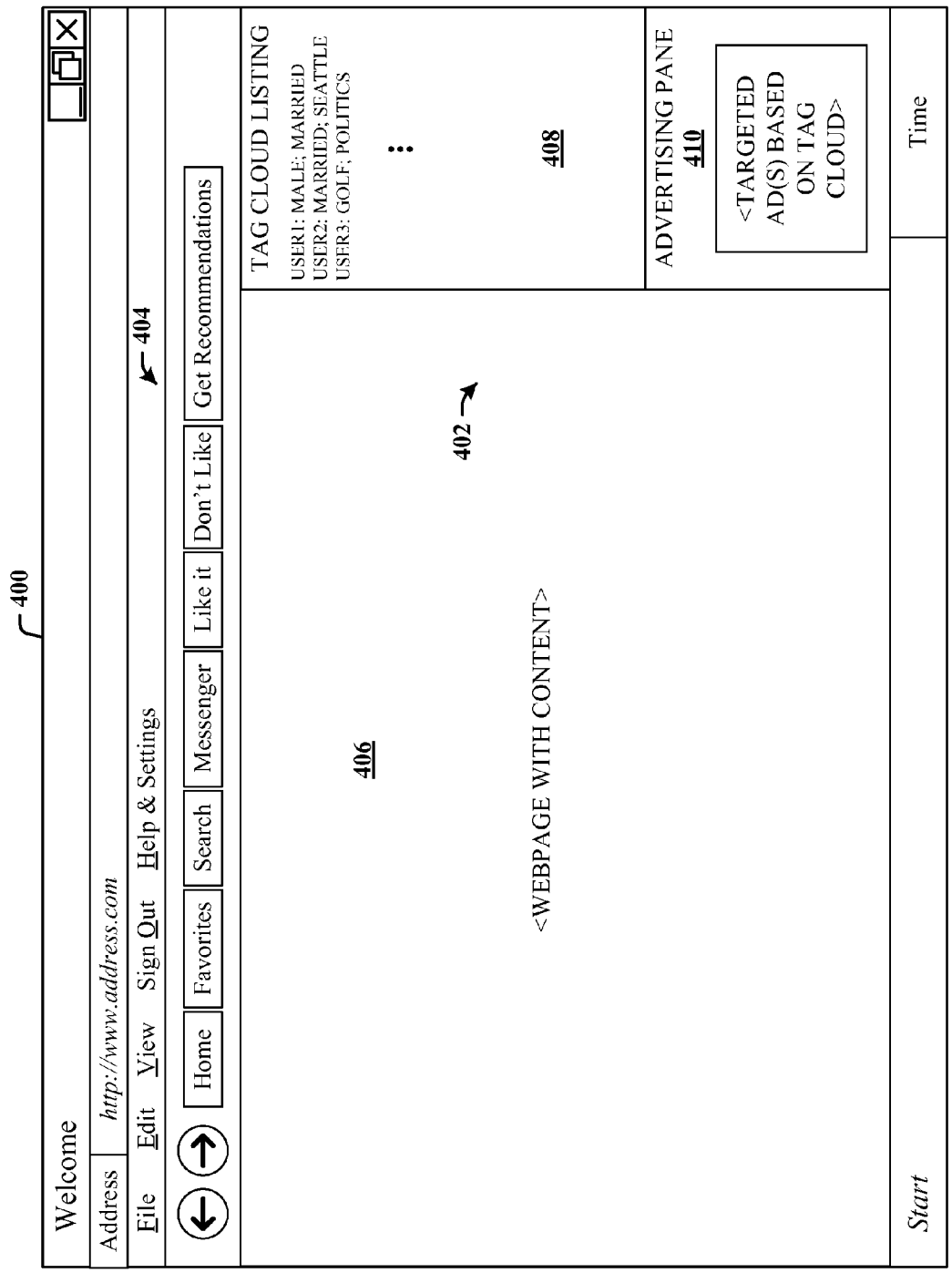
FIG. 4 illustrates an exemplary browser view showing side panels and graphical UI buttons and fields for providing additional functionality for social bookmarking and self tags.

FIG. 4 illustrates an exemplary browser view 400 showing side panels 402 and graphical UI buttons and fields 404 for providing additional functionality for social bookmarking and self tags. The view 400 includes a webpage with content 406, a "tag cloud" panel 408 for listing self tags for the current site. The tag cloud panel 408 can appear next to every webpage 406 that the user visits, and shows which self tag are most strongly associated with the current website. In one embodiment, the size (e.g., font) of the tag name indicates the strength of the association. For example, if the user is visiting a webpage about golf, the tag cloud panel 408 can show tags such as "golf", "retired", "male", and "tennis". Note that the tag cloud panel 408 describes what users (or previous visitors) like the webpage, and not necessarily what the webpage is about.

If the current user clicks on a tag (e.g., golf), a list of websites that are associated with that tag are shown. For example, if the tag cloud panel 408 contains the tag "republican" and the current user selects it, the user will be presented with a list of websites that republican-tagged users tend to like. This can be accompanied by advertisements or a list of advertisements that are republican-targeted, as presented in an advertising side panel 410.

The tag cloud panel 408 can also be used to show the users that liked/disliked the current website. In support of obtaining such information, the buttons 404 can include a "Like It" button and a "Don't Like It" (or similar terminology) which allows a user to vote or log an opinion about certain aspects being viewed. This voting data is combined with the self tags (e.g., as part of machine learning and reasoning) to learn and predict a user's preference based on the user's self tags.

The buttons 404 can also include a "get recommendations" button that when selected, causes a list of recommended websites to appear in the panel 408. The recommendations are based on the user's self tags. Recommendations can also be based on the combination of user self tags and website content, for example.

Figure 5:
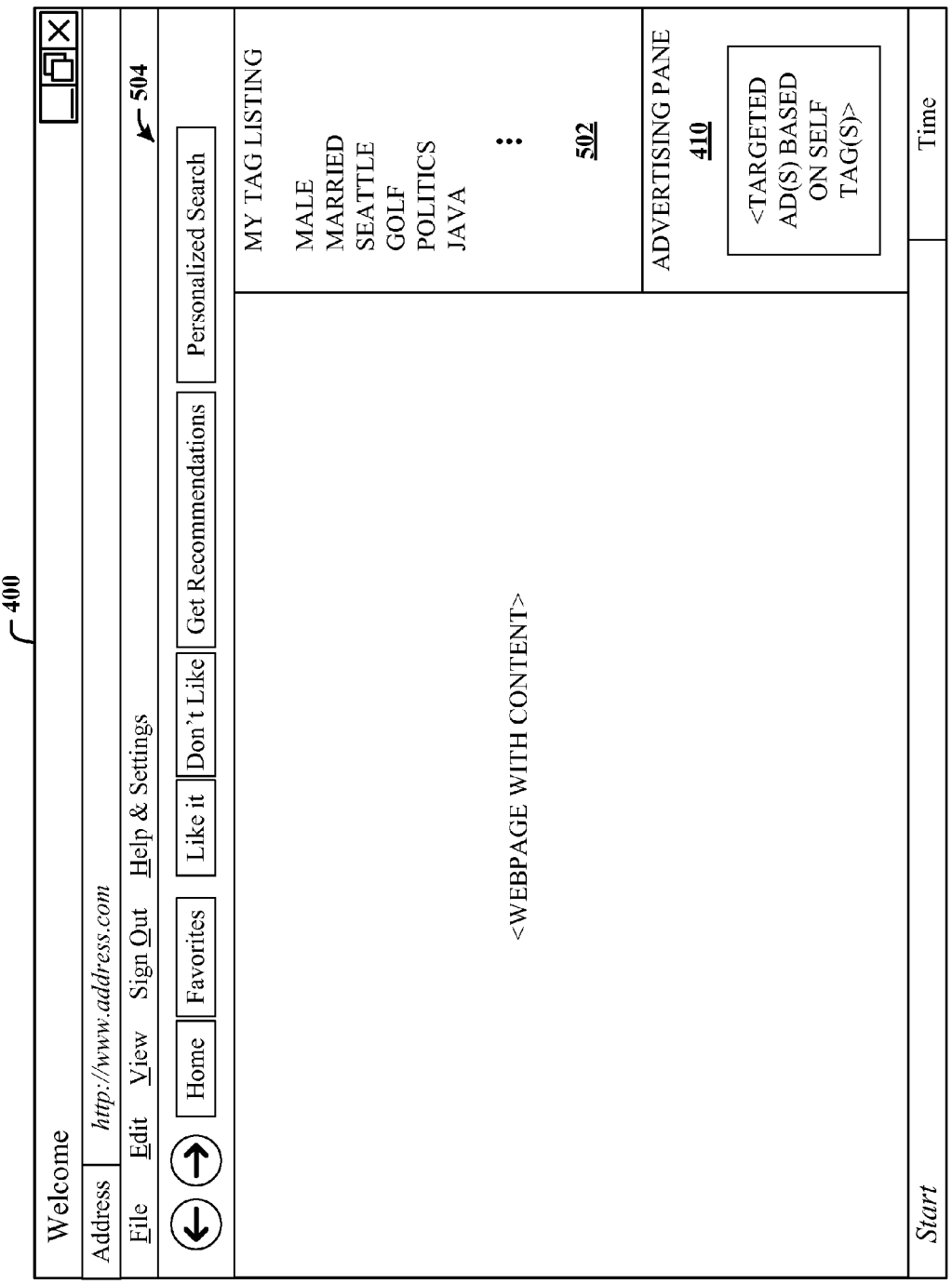
FIG. 5 illustrates the exemplary browser view showing a side panel of a list of user self tags and a search field.

FIG. 5 illustrates the exemplary browser view 400 showing a side panel 502 of a list of user self tags and a search field 504. The list in the panel 502 can be an editable list of "my Tags" that describe the user, for example, using demographic information such as "male", "married", and "retired", and/or information about user interests, such as "golf", "politics", and "java".

The user can weight the self tags individually depending on preferences at that time. Additionally, the user can have the ability to create multiple profiles, such as a "work" profile and a "home" profile. The user's self tags can be predicted or inferred by the system using statistical analysis (e.g., machine learning and reasoning) applied to the user's home page or blog. This can be facilitated by the user simply providing a link (e.g., a uniform resource locator (URL)) of the user homepage rather than recreating self tags or creating new self tags. The user's self tags can also be inferred by observing the user's voting behavior.

The search field 504 (also referred to as a "personalized search" box) can be provided similar to a conventional search engine box. However, the search results can be tailored to the type of self tags associated with the user. For instance, a search for "gifts" can return different results depending on whether the user has the self tag "male" or "female".

The advertising panel 410 can provide personalized advertising that is shown at various points during the viewing process and that are specific to the user's self tags. For instance, when the recommended sites are shown, a list of advertisements can be shown in the advertising panel 410.

Thus, a benefit is that the user profile is human understandable. That is, the user can instantly see what the system knows about the user's self tags and can manually adjust the user profile, as desired.

Figure 6:
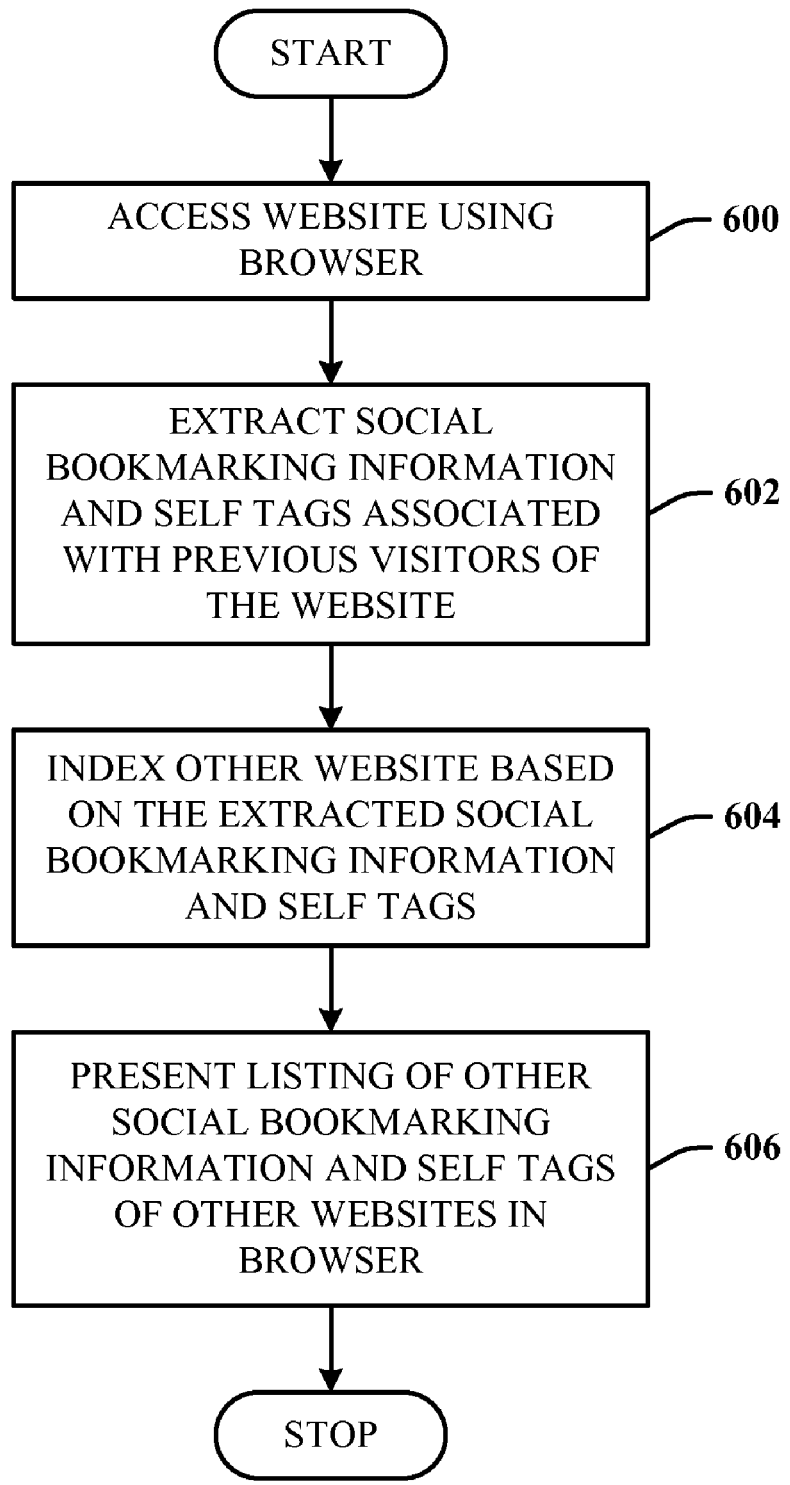
FIG. 6 illustrates a method of method of utilizing self tags.

FIG. 6 illustrates a method of method of utilizing self tags. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

At 600, a website is accessed using a browser. At 602, social bookmarking information and self tags associated with previous visitors of the website are extracted. At 604, other websites are indexed based on the extracted social bookmarking information and self tags. At 606, a listing of other social bookmarking information and self tags of the other websites is presented in the browser.

Figure 7:
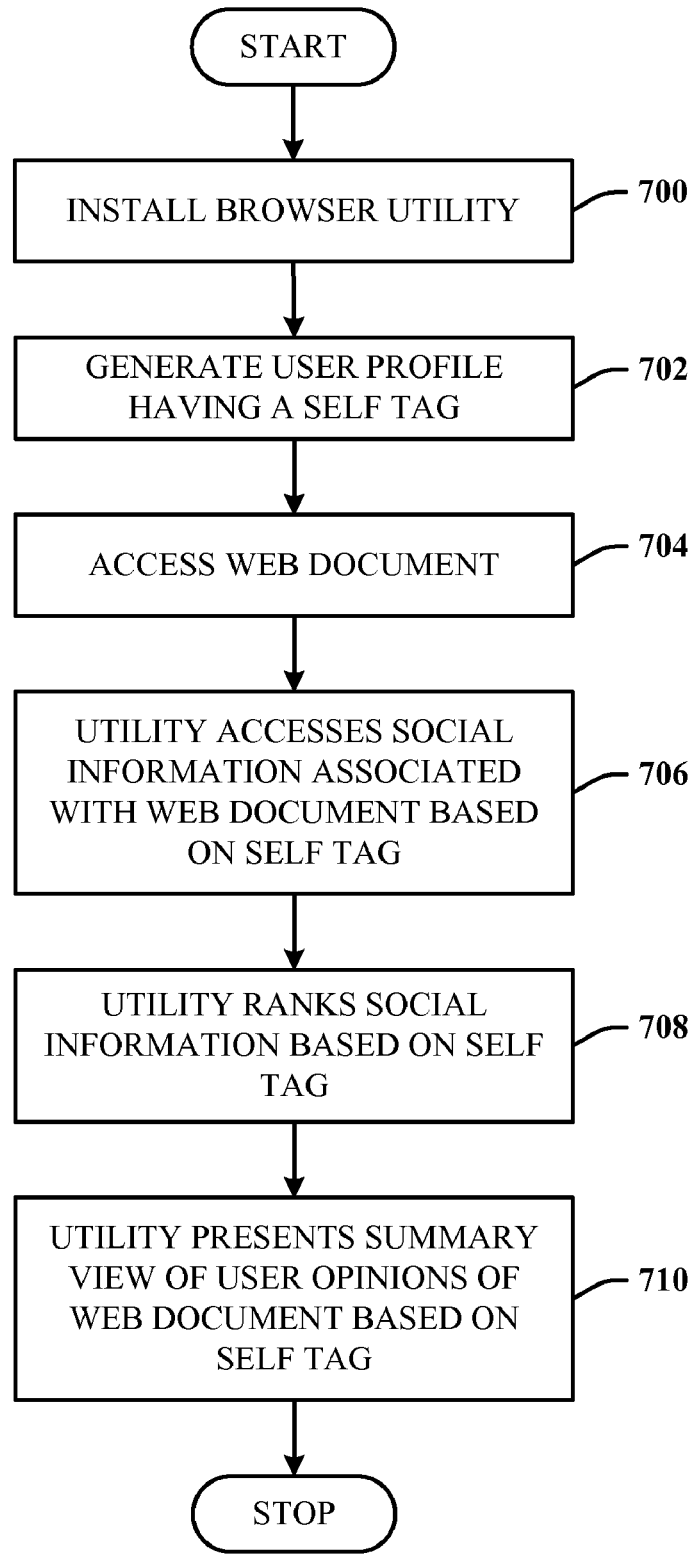
FIG. 7 illustrates a method of providing ranked search results based on self tags.

FIG. 7 illustrates a method of providing ranked search results based on self tags. At 700, the utility is installed in a browser. At 702, a user profile is generated having at least one self tag. At 704, the user accesses a website. At 706, the utility accesses social bookmarking information associated with a web document based on the self tag. At 708, the utility ranks the social information based on the self tag. At 710, the utility presents a summary view of the user opinions of the web document based on the self tag.

Figure 8:
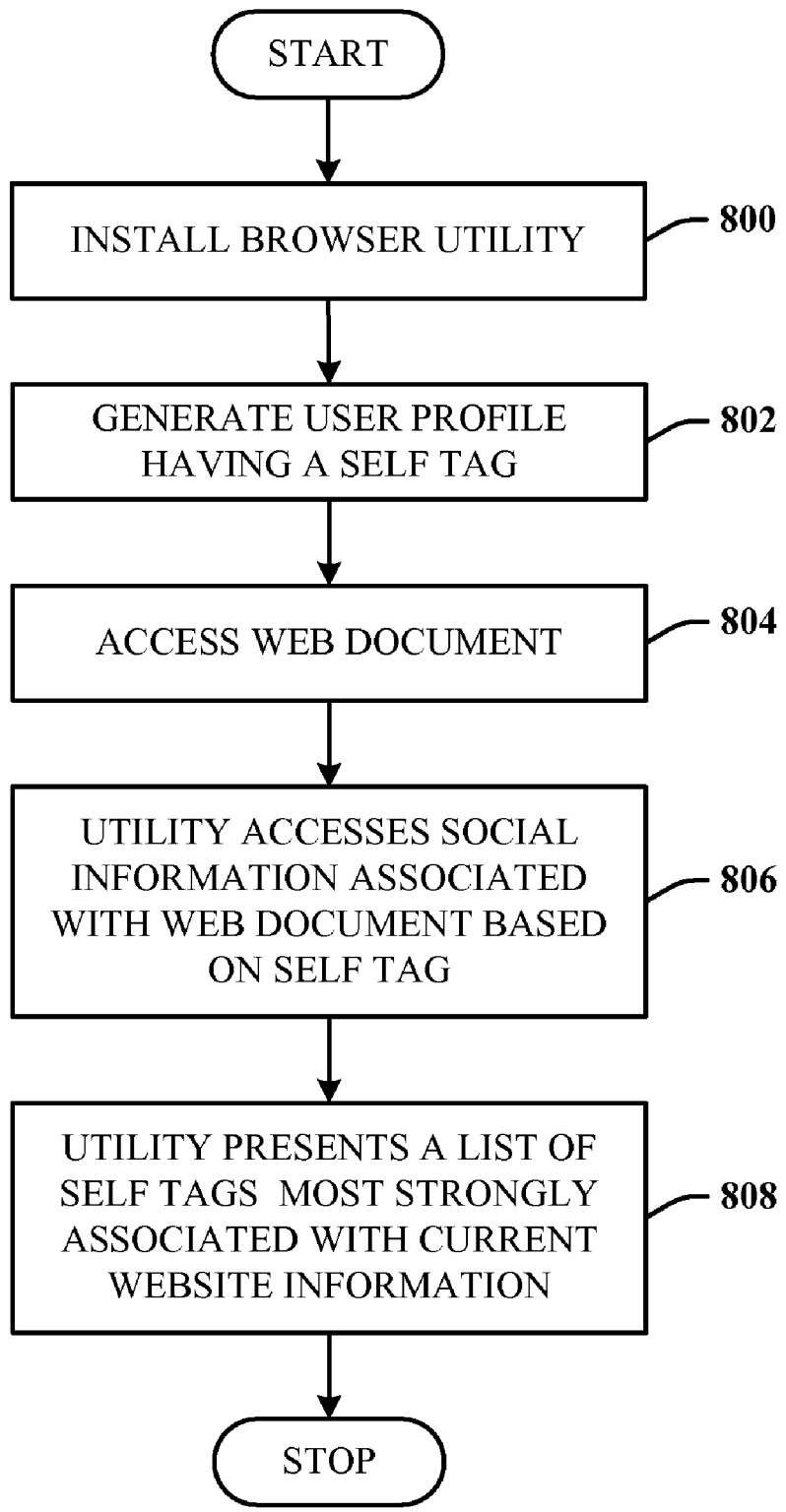
FIG. 8 illustrates a method of presenting a tag cloud view of previous visitor self tags associated with website information.

FIG. 8 illustrates a method of presenting a tag cloud view of previous visitor self tags associated with website information. At 800, the utility is installed in a browser. At 802, a user profile is generated having at least one self tag. At 804, the user accesses a website. At 806, the utility accesses social bookmarking information associated with a web document based on the self tag. At 808, the utility presents a list of self tags of previous visitors most strongly associated with current website information.

Figure 9:
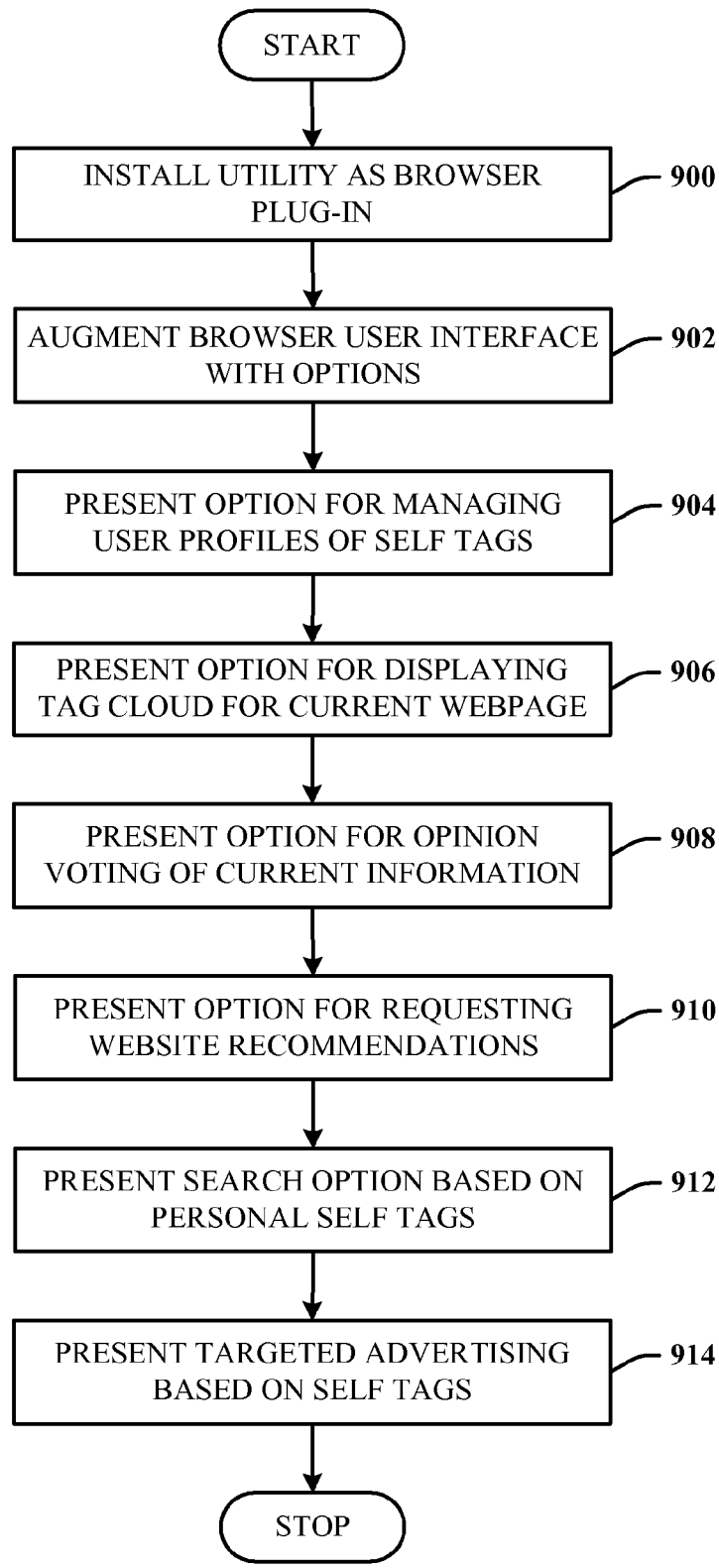
FIG. 9 illustrates a method of augmenting a browser with user selections for facilitating enhanced social bookmarking using self tags.

FIG. 9 illustrates a method of augmenting a browser with user selections for facilitating enhanced social bookmarking using self tags. At 900, the utility is installed in the browser as a plug-in. At 902, as part of the installation, the browser is augmented with user interface options. At 904, an option is presented for managing user profiles that include one or more self tags. This option facilitates the creation of new profiles and editing of existing profiles. At 906, an option is presented for displaying a tag cloud for a current webpage. This option can also be used to cause self tags to be displayed based on the content of the webpage as well. At 908, an option is presented for opinion voting by the current user on the currently displayed information. At 910, an option is presented for requesting website recommendations. The recommendations can be based on the user self tags, or a combination of the user self tags and website content. At 912, a search option is presented based on personal self tags. At 914, targeted advertising is presented based on the self tags.

Figure 10:
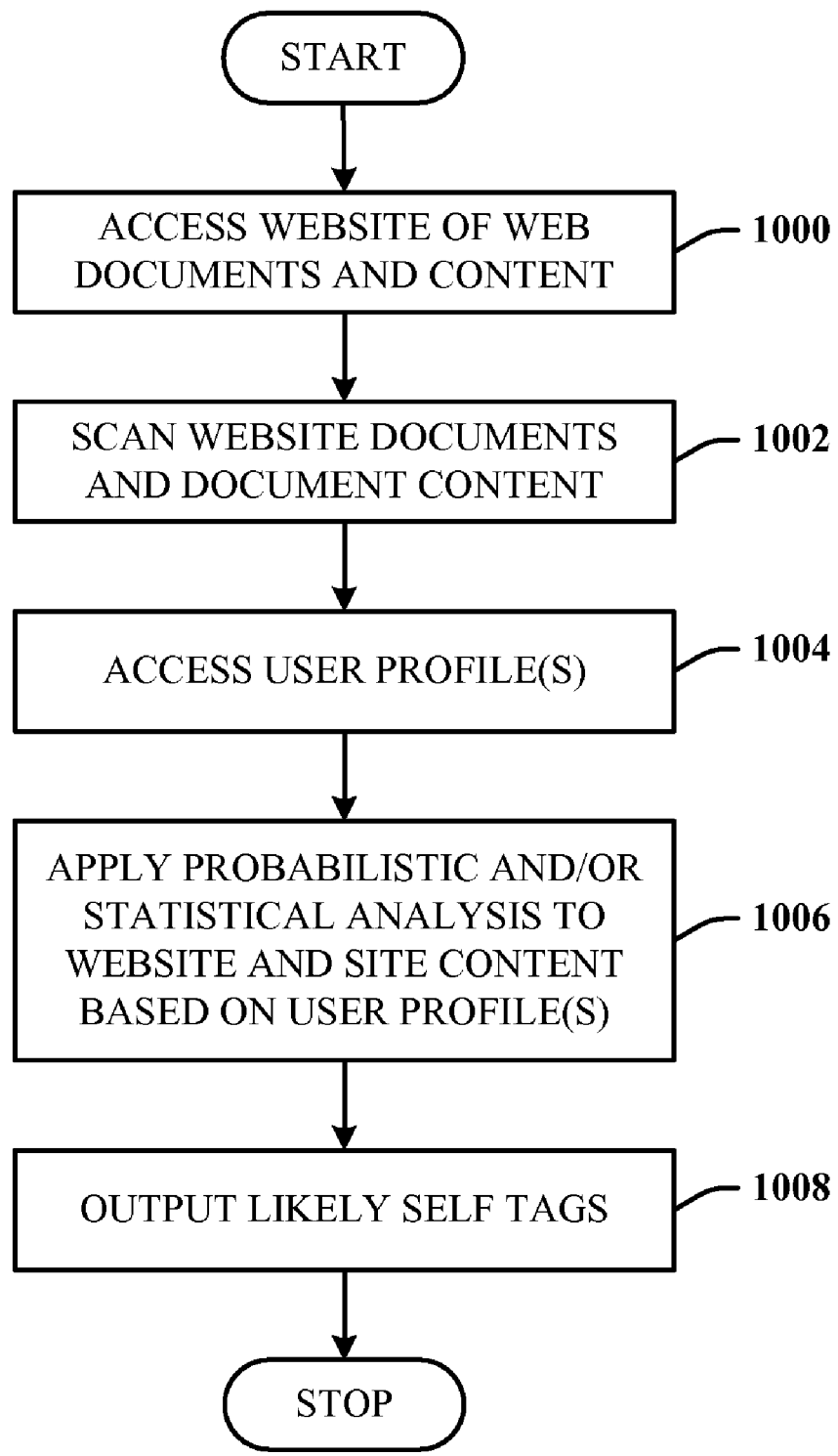
FIG. 10 illustrates a method of applying machine learning and reasoning to social bookmarking and self tags.

FIG. 10 illustrates a method of applying machine learning and reasoning to social bookmarking and self tags. At 1000, a website of web documents and content is accessed. At 1002, the website documents and content are scanned. At 1004, one or more user profiles having self tags are accessed. At 1006, probabilistic and/or statistical analysis is applied to the website and content based on the user profiles. At 1008, based on he analysis, likely (or candidate) user self tags are output and presented to the user.

Figure 11:
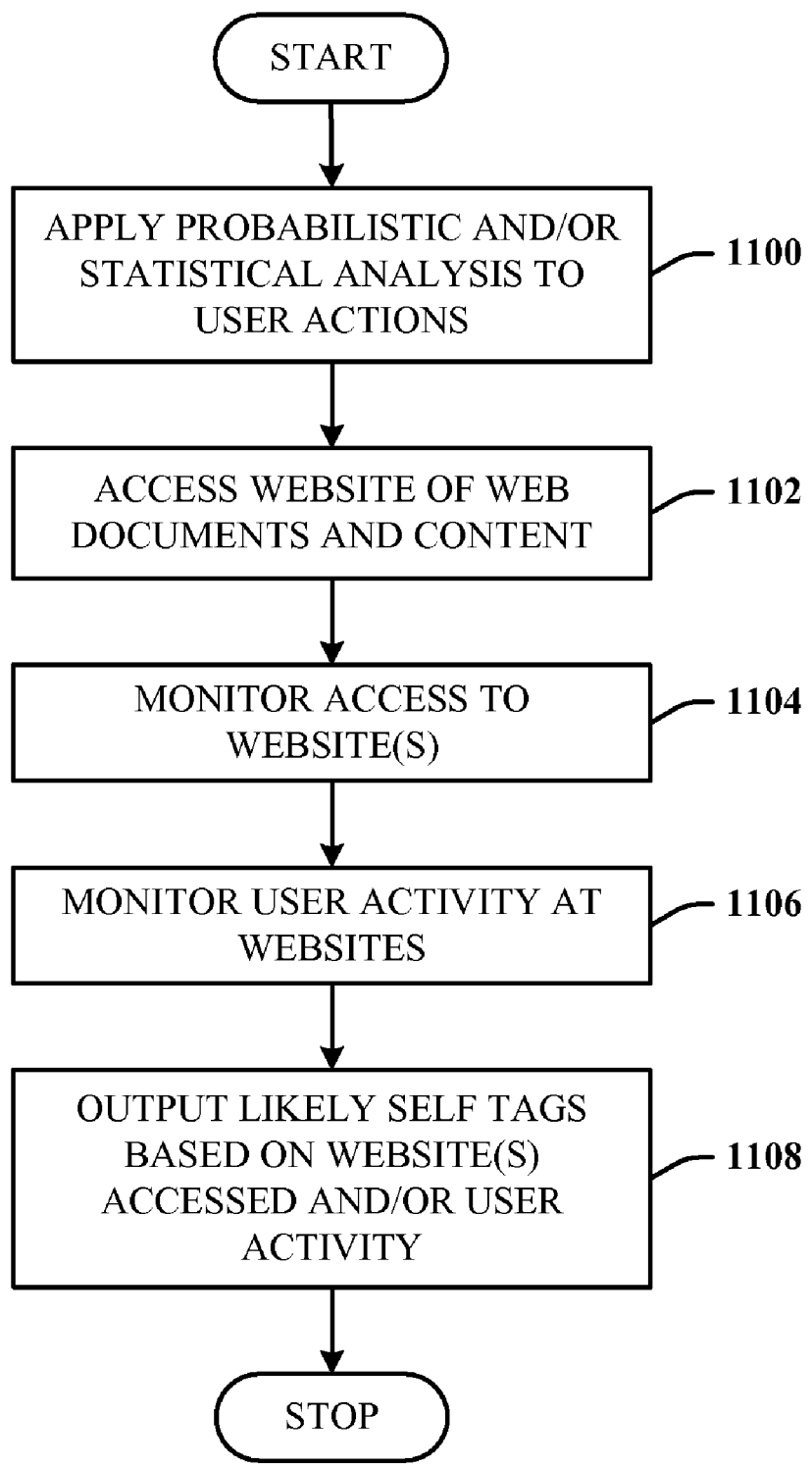
FIG. 11 illustrates a method of generating self tags based on user activity.

FIG. 11 illustrates a method of generating self tags based on user activity. At 1100, probabilistic and/or statistical analysis is applied to user actions. At 1102, the user accesses a website of documents and document content. At 1104, user access to one or more websites is monitored. At 1106, user activity at the websites is monitored. At 1108, likely or candidate self tags are output based on the websites accessed and/or user activity.

While certain ways of displaying information to users are shown and described with respect to certain figures as screenshots, those skilled in the relevant art will recognize that various other alternatives can be employed. The terms "screen," "screenshot", "webpage," "document", and "page" are generally used interchangeably herein. The pages or screens are stored and/or transmitted as display descriptions, as graphical user interfaces, or by other methods of depicting information on a screen (whether personal computer, PDA, mobile telephone, or other suitable device, for example) where the layout and information or content to be displayed on the page is stored in memory, database, or another storage facility.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Figure 12:
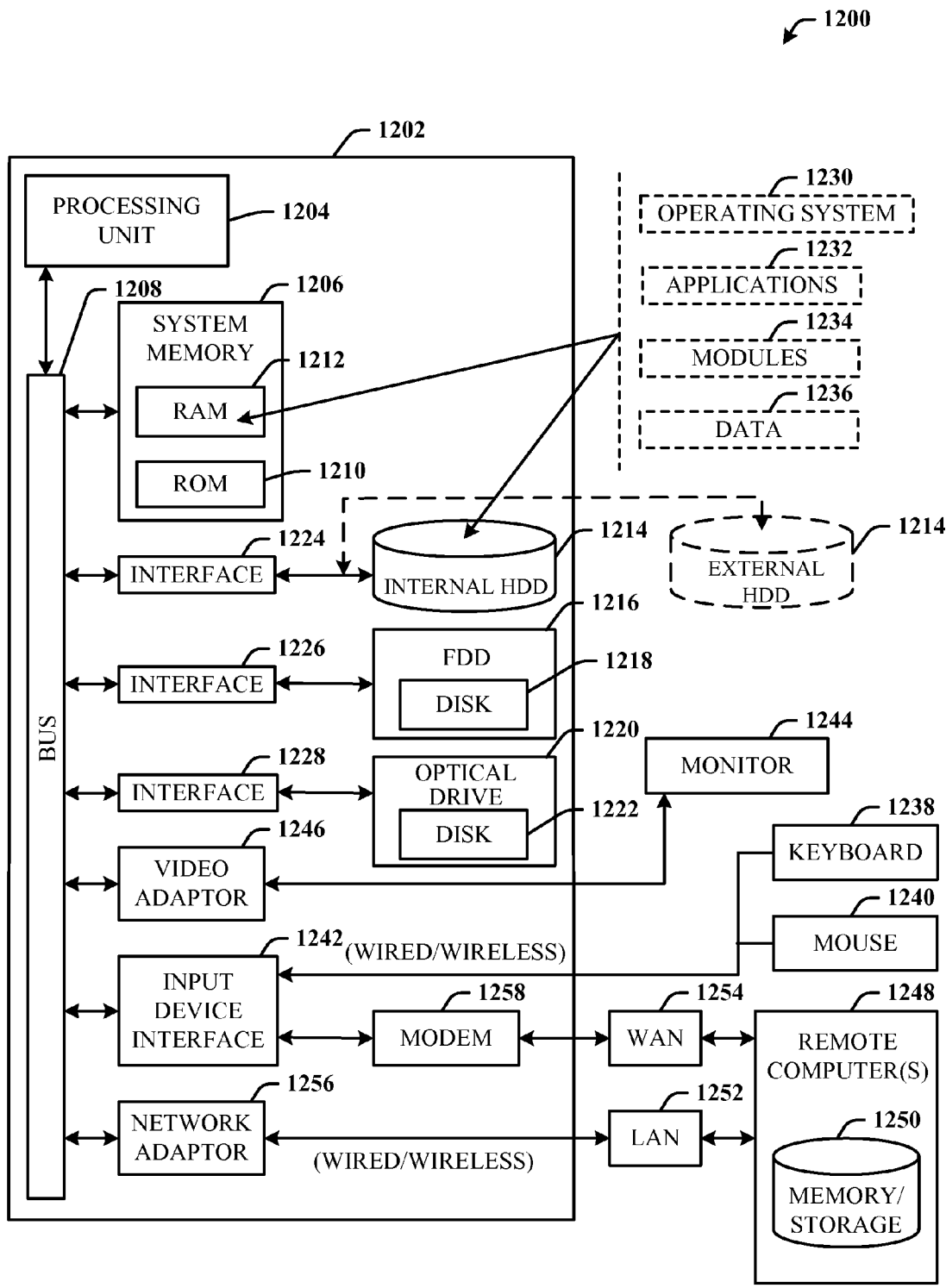
FIG. 12 illustrates a block diagram of a computing system operable to execute the disclosed bookmarking and self tagging architecture.

Referring now to FIG. 12, there is illustrated a block diagram of a computing system 1200 operable to execute the disclosed bookmarking and self tagging architecture. In order to provide additional context for various aspects thereof, FIG. 12 and the following discussion are intended to provide a brief, general description of a suitable computing system 1200 in which the various aspects can be implemented. While the description above is in the general context of computer-executable instructions that may run on one or more computers, those skilled in the art will recognize that a novel embodiment also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes volatile and non-volatile media, removable and non-removable media. By way of example, and not limitation, computer-readable media can comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 12, the exemplary computing system 1200 for implementing various aspects includes a computer 1202, the computer 1202 including a processing unit 1204, a system memory 1206 and a system bus 1208. The system bus 1208 provides an interface for system components including, but not limited to, the system memory 1206 to the processing unit 1204. The processing unit 1204 can be any of various commercially available processors. Dual microprocessors and other multi-processor architectures may also be employed as the processing unit 1204.

The system bus 1208 can be any of several types of bus structure that may further interconnect to a memory bus (with or without a memory controller), a peripheral bus, and a local bus using any of a variety of commercially available bus architectures. The system memory 1206 includes read-only memory (ROM) 1210 and random access memory (RAM) 1212. A basic input/output system (BIOS) is stored in a non-volatile memory 1210 such as ROM, EPROM, EEPROM, which BIOS contains the basic routines that help to transfer information between elements within the computer 1202, such as during start-up. The RAM 1212 can also include a high-speed RAM such as static RAM for caching data.

The computer 1202 further includes an internal hard disk drive (HDD) 1214 (e.g., EIDE, SATA), which internal hard disk drive 1214 may also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1220 can be connected to the system bus 1208 by a hard disk drive interface 1224, a magnetic disk drive interface 1226 and an optical drive interface 1228, respectively. The interface 1224 for external drive implementations includes at least one or both of Universal Serial Bus (USB) and IEEE 1394 interface technologies.

The drives and their associated computer-readable media provide nonvolatile storage of data, data structures, computer-executable instructions, and so forth. For the computer 1202, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing novel methods of the disclosed architecture.

A number of program modules can be stored in the drives and RAM 1212, including an operating system 1230, one or more application programs 1232, other program modules 1234 and program data 1236. The one or more application programs 1232, other program modules 1234 and program data 1236 can include the extraction component 10, indexing component 110, datasources 108, browser 202, profile component 204, UIA 206, MLR component 302, browser 304, tagging component 306, weighting component 308, advertising component 310, and search component 312, for example.

All or portions of the operating system, applications, modules, and/or data can also be cached in the RAM 1212. It is to be appreciated that the disclosed architecture can be implemented with various commercially available operating systems or combinations of operating systems.

A user can enter commands and information into the computer 1202 through one or more wire/wireless input devices, for example, a keyboard 1238 and a pointing device, such as a mouse 1240. Other input devices (not shown) may include a microphone, an IR remote control, a joystick, a game pad, a stylus pen, touch screen, or the like. These and other input devices are often connected to the processing unit 1204 through an input device interface 1242 that is coupled to the system bus 1208, but can be connected by other interfaces, such as a parallel port, an IEEE 1394 serial port, a game port, a USB port, an IR interface, etc.

A monitor 1244 or other type of display device is also connected to the system bus 1208 via an interface, such as a video adapter 1246. In addition to the monitor 1244, a computer typically includes other peripheral output devices (not shown), such as speakers, printers, etc.

The computer 1202 may operate in a networked environment using logical connections via wire and/or wireless communications to one or more remote computers, such as a remote computer(s) 1248. The remote computer(s) 1248 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1250 is illustrated. The logical connections depicted include wire/wireless connectivity to a local area network (LAN) 1252 and/or larger networks, for example, a wide area network (WAN) 1254. Such LAN and WAN networking environments are commonplace in offices and companies, and facilitate enterprise-wide computer networks, such as intranets, all of which may connect to a global communications network, for example, the Internet.

When used in a LAN networking environment, the computer 1202 is connected to the local network 1252 through a wire and/or wireless communication network interface or adapter 1256. The adaptor 1256 may facilitate wire or wireless communication to the LAN 1252, which may also include a wireless access point disposed thereon for communicating with the wireless adaptor 1256.

When used in a WAN networking environment, the computer 1202 can include a modem 1258, or is connected to a communications server on the WAN 1254, or has other means for establishing communications over the WAN 1254, such as by way of the Internet. The modem 1258, which can be internal or external and a wire and/or wireless device, is connected to the system bus 1208 via the serial port interface 1242. In a networked environment, program modules depicted relative to the computer 1202, or portions thereof, can be stored in the remote memory/storage device 1250. It will be appreciated that the network connections shown are exemplary and other means of establishing a communications link between the computers can be used.

The computer 1202 is operable to communicate with any wireless devices or entities operatively disposed in wireless communication, for example, a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Figure 13:
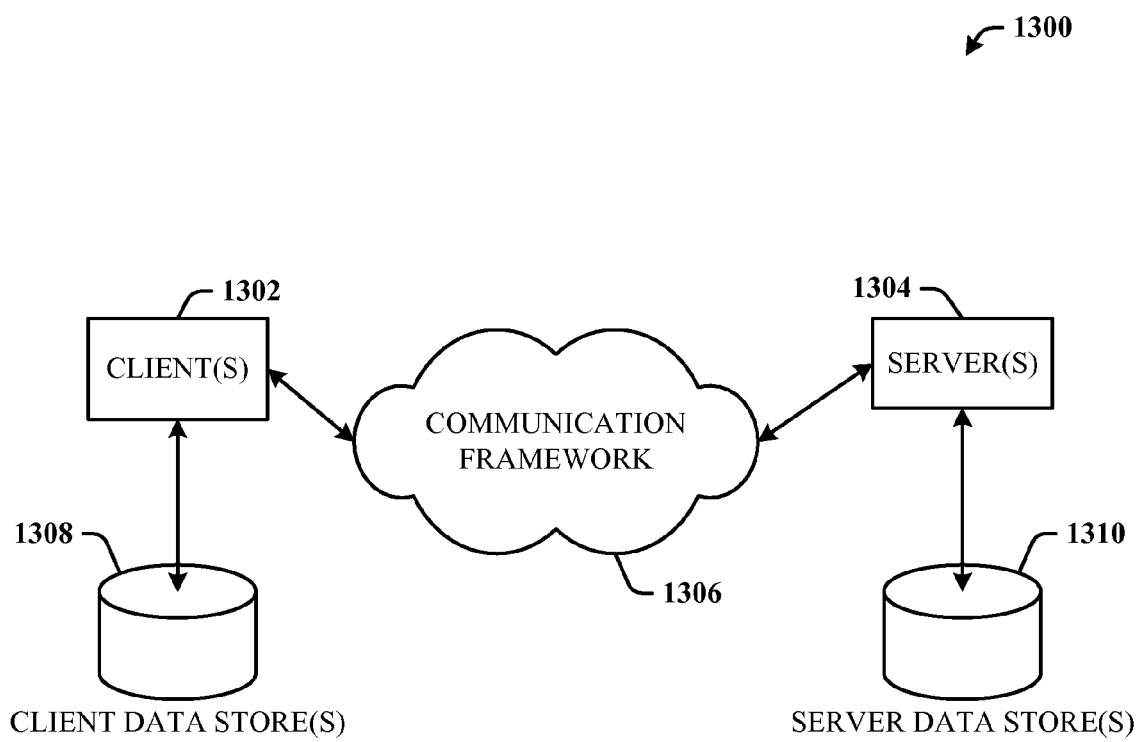
FIG. 13 illustrates a schematic block diagram of an exemplary computing environment for social bookmarking and self tags.

Referring now to FIG. 13, there is illustrated a schematic block diagram of an exemplary computing environment 1300 for social bookmarking and self tags. The system 1300 includes one or more client(s) 1302. The client(s) 1302 can be hardware and/or software (e.g., threads, processes, computing devices). The client(s) 1302 can house cookie(s) and/or associated contextual information, for example.

The system 1300 also includes one or more server(s) 1304. The server(s) 1304 can also be hardware and/or software (e.g., threads, processes, computing devices). The servers 1304 can house threads to perform transformations by employing the architecture, for example. One possible communication between a client 1302 and a server 1304 can be in the form of a data packet adapted to be transmitted between two or more computer processes. The data packet may include a cookie and/or associated contextual information, for example. The system 1300 includes a communication framework 1306 (e.g., a global communication network such as the Internet) that can be employed to facilitate communications between the client(s) 1302 and the server(s) 1304.

Communications can be facilitated via a wire (including optical fiber) and/or wireless technology. The client(s) 1302 are operatively connected to one or more client data store(s) 1308 that can be employed to store information local to the client(s) 1302 (e.g., cookie(s) and/or associated contextual information). Similarly, the server(s) 1304 are operatively connected to one or more server data store(s) 1310 that can be employed to store information local to the servers 1304. The clients 1302 can include the browsers (202 and 304) and the servers can include the datasources 108 (e.g., websites), for example.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A hardware processor executing a computer-implemented browser utility, the utility comprising:
    an extraction component for extracting social bookmarking information and associated self tags of a data source on a network, the self tags attributed by users to attributes of themselves, the attributes including at least one of gender, place of employment, location, special interest, or representation of a user community;
    an indexing component for indexing network data sources based on the social bookmarking information and associated self tags;
    a user interface component for facilitating user interaction with the indexed social bookmarking information and associated self tags, the user interface component comprising a panel that allows the users to list and edit the self tags, the user interface component displays the panel for user interaction with the list and self tags; and
    a weighting component for allowing the users to weight self tags to bias the attributes to the data source.

2. The system of claim 1, wherein the extraction component extracts the social bookmarking information and associated self tags of the datasource in response to a client application accessing the datasource.

3. The system of claim 1, wherein the weighting component enables weighting one or more of the self tags at a given point in time.

4. The system of claim 1, wherein the user interface component presents a listing of the indexed social bookmarking information and associated self tags as indexed by the indexing component.

5. The system of claim 1, further comprising a profile component for generating a user profile of self tags.

6. The system of claim 5, further comprising a tagging component for automatically tagging the social bookmarking information and associated self tags with self tags based on the user profile.

7. The system of claim 6, further comprising an advertising component for providing targeted advertising based on the self tags.

8. The system of claim 1, further comprising a user interface for presenting a listing of the self tags most strongly associated with the datasource.

9. The system of claim 1, further comprising a user interface for logging opinion data associated with the datasource, the opinion data related to at least one of a website, webpage, or content of the webpage.

10. The system of claim 1, further comprising a search component for processing a search of the indexed network datasources based on previously-defined self tags.

11. The system of claim 1, further comprising a machine learning and reasoning component that employs probabilistic and/or statistical-based analysis to learn and reason about user activities and accessed documents, and in response thereto, prognose or infer an action that a user desires to be automatically performed.

12. A computer-implemented method of utilizing self tags, the method executed by a processor, comprising:
accessing a website using a browser;
extracting social bookmarking information and self tags associated with previous visitors of the website, the self tags attributed by the previous visitors to attributes of themselves, the attributes including at least one of gender, place of employment, location, special interest, or representation of a user community;
indexing other websites based on the extracted social bookmarking information and self tags;
interacting with the social bookmarking information and associated self tags via a user interface that comprises a panel that allows the user to list and edit the self tags;
weighting the self tags to bias the attributes of the self tags to content of the website; and
displaying a listing of other social bookmarking information and self tags of the other web sites in the browser.

13. The method of claim 12, further comprising creating a user profile that includes user self tags, and searching the listing of the other social bookmarking information and self tags based on the user self tags.

14. The method of claim 12, further comprising presenting one or more opinion buttons the selection of which records a corresponding opinion based on the website, a webpage of the website, or content of the webpage.

15. The method of claim 12, further comprising generating new user self tags for a user based on user interaction with the website.

16. The method of claim 12, further comprising generating new user self tags for a user based on content of the website.

17. The method of claim 12, further comprising recommending one or more links to other websites based on user self tags and website content.

18. The method of claim 12, further comprising presenting a summary view of opinion data and usernames of previous visitors of the website, the opinion data based on at least one of the website, a webpage of the website, or content of the webpage, and the summary view is presented based on at least one self tag of a user currently accessing the website.

19. The method of claim 12, further comprising automatically generating user self tags based on a source of user information that is accessible by a link.

20. A computer-implemented system, comprising:
computer-implemented means for accessing a website by a user;
computer-implemented means for extracting visitor self tags associated with previous visitors of the website, the self tags attributed by the previous visitors to attributes of themselves, the attributes including at least one of gender, place of employment, location, special interest, or representation of a user community;
computer-implemented means for indexing other websites based on the visitor self tags;
computer-implemented means for interacting with the indexed social bookmarking information and associated self tags via a panel that allows the user to list and edit the self tags;
computer-implemented means for searching the indexed listing of other websites for results based on user self tags of the user;
computer-implemented means for weighting the self tags to bias the attributes of the self tags to content of the website; and
computer-implemented means for displaying the results via a browser.

* * * * *